United States Patent
Sonobe et al.

(10) Patent No.: US 8,574,533 B2
(45) Date of Patent: Nov. 5, 2013

(54) MATERIAL FOR NEGATIVE ELECTRODE OF NON-AQUEOUS ELECTROLYTE SECONDARY BATTERY, PROCESS FOR PRODUCING THE SAME, NEGATIVE ELECTRODE AND BATTERY

(75) Inventors: Naohiro Sonobe, Fukushima-Ken (JP); Hiroshi Ohta, Fukushima-Ken (JP); Takahiro Akita, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 1015 days.

(21) Appl. No.: 10/583,762

(22) PCT Filed: Mar. 25, 2005

(86) PCT No.: PCT/JP2005/005580
§ 371 (c)(1),
(2), (4) Date: Jun. 21, 2006

(87) PCT Pub. No.: WO2005/098998
PCT Pub. Date: Oct. 20, 2005

(65) Prior Publication Data
US 2009/0140214 A1   Jun. 4, 2009

(30) Foreign Application Priority Data
Mar. 30, 2004 (JP) .................... 2004-100749

(51) Int. Cl.
| D01F 9/12 | (2006.01) |
| D01F 9/16 | (2006.01) |
| C01B 31/00 | (2006.01) |
| C01B 31/04 | (2006.01) |
| C01D 3/00 | (2006.01) |
| C09C 1/56 | (2006.01) |
| H01M 4/13 | (2010.01) |
| H01M 4/60 | (2006.01) |
| H01M 6/00 | (2006.01) |
| H01B 1/04 | (2006.01) |

(52) U.S. Cl.
USPC ............. 423/445 R; 423/447.7; 423/494.4; 423/460; 423/447.2; 423/447.9; 429/122; 429/213; 252/502; 252/503

(58) Field of Classification Search
None
See application file for complete search history.

(56) References Cited

U.S. PATENT DOCUMENTS

| 5,244,757 A | 9/1993 | Takami et al. |
| 5,527,643 A * | 6/1996 | Sonobe et al. ............. 429/231.8 |
| 5,587,255 A * | 12/1996 | Sonobe et al. ............. 429/231.8 |
| 5,591,547 A * | 1/1997 | Yoneda et al. ................ 429/220 |
| 5,616,436 A * | 4/1997 | Sonobe et al. ............. 429/231.8 |
| 5,741,472 A | 4/1998 | Sonobe et al. |
| 5,772,974 A | 6/1998 | Ohashi et al. |
| 5,932,373 A * | 8/1999 | Nagamine et al. ........ 429/218.1 |
| 6,218,050 B1 * | 4/2001 | Yoon et al. ................ 429/231.8 |
| 6,344,296 B1 * | 2/2002 | Ishii et al. ................. 429/231.8 |
| 2008/0063592 A1 * | 3/2008 | Nakahara et al. ........... 423/449.1 |
| 2009/0068470 A1 * | 3/2009 | Choi et al. .................... 428/403 |

FOREIGN PATENT DOCUMENTS

| EP | 0 495 613 | 7/1992 |
| EP | 0 700 106 | 3/1996 |
| EP | 0 726 606 | 8/1996 |
| JP | 7-320740 | 12/1995 |
| JP | 8-64207 | 3/1996 |
| WO | 02/083557 A1 | 10/2002 |
| WO | WO 02083557 A1 * | 10/2002 |

OTHER PUBLICATIONS

Lu et al.; Anodic Performance of Vapor-Derived Carbon Filaments in Lithium-Ion Secondary Battery; Carbon; 39, 493-496; 2001.*
Supplementary European Search Report dated Apr. 18, 2012 in EP Application No. 05721507.1.

* cited by examiner

*Primary Examiner* — Guinever Gregorio
(74) *Attorney, Agent, or Firm* — Wenderoth, Lind & Ponack, L.L.P.

(57) ABSTRACT

A negative electrode material for non-aqueous electrolyte secondary batteries, comprises: a carbon material having a sphericity of at least 0.8, and exhibiting an average (002) interlayer spacing $d_{002}$ of 0.365-0.400 nm, a crystallite size in a c-axis direction $Lc_{(002)}$ of 1.0-3.0 nm, as measured by X-ray diffractometry, a hydrogen-to-carbon atomic ratio (H/C) of at most 0.1 as measured by elementary analysis, and an average particle size $Dv_{50}$ of 1-20 μm. The negative electrode material is spherical and exhibits excellent performances including high output performance and durability.

10 Claims, No Drawings

MATERIAL FOR NEGATIVE ELECTRODE OF NON-AQUEOUS ELECTROLYTE SECONDARY BATTERY, PROCESS FOR PRODUCING THE SAME, NEGATIVE ELECTRODE AND BATTERY

TECHNICAL FIELD

The present invention relates to an electrode of secondary batteries and more particularly to a negative electrode material for non-aqueous electrolyte secondary batteries which allows quick doping-dedoping of battery active substance and is excellent in charge-discharge cycle characteristic.

BACKGROUND ART

As a type of high-energy density secondary battery, there has been proposed a non-aqueous electrolyte-type lithium secondary battery (e.g., Patent documents 1-4 listed below). The battery utilizes a phenomenon that a carbon intercalation compound of lithium can be easily formed electrochemically, and when the battery is charged, lithium in the positive electrode comprising, e.g., a chalcogenide compound such as $LiCoO_2$, is electrochemically inserted between carbon layers in the negative electrode (doping). The carbon thus-doped with lithium function as a lithium electrode to cause a discharge, whereby the lithium is liberated (dedoped) from the carbon layers to return to the positive electrode.

In order to achieve a higher energy density in such a non-aqueous electrolyte-type lithium secondary battery, it is necessary to increase the amount of lithium dedoped and doped per unit weight of the positive electrode, substance and the amount of lithium doped and dedoped per unit weight of the negative electrode. From such a viewpoint, a graphitic material having high doping and dedoping capacity per volume has been used particularly as a negative electrode material.

In recent years, a non-aqueous electrolyte-type lithium secondary battery has been expected to be used not only as a power supply for small-size portable instruments but also as a power supply for a hybrid electrical vehicle (hereinafter abbreviated as a "HEV"). Such a HEV is loaded with an internal-combustion engine in addition to the battery as motive power supplies therefor, so that the battery is not required to supply a large amount of energy but is required to supply a high power output capable of driving the vehicle or sufficiently supplementing the motive power of the vehicle. Further, in order to achieve a lower fuel consumption, it is indispensable to effectively recover a braking energy of the vehicle and is further required to exhibit a high input capacity.

On the other hand, while the expected life of a non-aqueous electrolyte secondary battery as a power supply for small-size portable instruments is several years, a power supply system for HEVs, comprising several tens of batteries connected in series cannot be easily exchanged in the middle of the life of the vehicle but is required to exhibit a life and a reliability comparable to the life of the vehicle, i.e., of 10 or more years.

As a means for improving the output performance of a non-aqueous electrolyte secondary battery, there has been proposed to control the electrode thickness and the particle size of the active substance (Patent document 5 listed below). More specifically, by making thinner the electrode, it becomes possible to increase the reaction area and reduce the reaction potential difference in the electrode thickness direction. As a result, it becomes possible to reduce a polarization between the surfacemost layer and a layer close to the electroconductive substrate of the electrode, thereby reducing a lowering of performance at the time of a large current discharge. However, the output is not yet sufficient and a higher output is demanded. Further, accompanying the use of a thinner electrode, larger numbers of conductive substrates and separators for the positive and negative electrodes are required than usual, and this results in a lowering of energy density of the battery, for which an improvement is also desired.

As for the reliability of a negative electrode material, a graphitic material and a graphitizable carbon material having a turbostratic texture are liable to cause a repetition of expansion and constriction of crystallites at the time of doping and dedoping of lithium, so that they are poor in reliability as a negative electrode material of non-aqueous electrolyte secondary battery used for HEVs. On the other hand, non-graphitizable carbon material causes little expansion and constriction at the time of doping and dedoping of lithium to exhibit a high cycle durability so that it is expected to be promising as a negative electrode material of non-aqueous electrolyte-type lithium secondary battery used for HEVs. However, the texture of non-graphitizable carbon is variously changed depending on the texture of a carbon precursor and heat-treatment conditions thereafter, an appropriate texture control is important for achieving good charge-discharge performances. Non-graphitizable carbon particle exhibiting good charge-discharge performances have been obtained through pulverization of a carbon precursor itself or after calcination thereof, so that it requires a lot of pulverization energy for providing a smaller particle size which is indispensable for achieving a thin layer of electrode active substance and the smaller particle size is accompanied with an increased amount of fine powder to result in a lowering in reliability of the battery. There also arises a problem that the enhancement of pulverization and removal of fine particles for providing the smaller particle size results in a remarkable lowering in pulverization efficiency.

It has been proposed to use a non-graphitizable carbon having a spherical shape as a negative electrode active substance for providing a non-aqueous electrolyte exhibiting a high energy density and less liability of short circuit due to formation of dendrite, thus exhibiting a high reliability (Patent document 6 listed below). It is intended to form a negative electrode having a uniform distribution of active substance through coating, etc., by using spherical carbon as the negative electrode active substance, and thereby to provide a negative electrode with less liability of internal short circuit due to dendrite formation and with an electrical capacity closer to a theoretical one. However, substantially no process for producing the spherical non-graphitizable carbon is disclosed, and the description of a bulk specific gravity of 0.6-0.9 therein provides an assumption that the carbon had a true density of ca. 1.7-2.5, which rather falls within a region of from graphitizable carbon to graphite. Further, the discharge capacity thereof was at most 320 mAh/g, which does not exceed the theoretical capacity of graphitic material and is not sufficiently large.

On the other hand, while it is easily conceived of carbonizing a spherical synthetic resin in order to obtain a spherical carbon material, this is actually not easy. Synthetic reins include: thermosetting resins causing polycondensation under heating and vinyl resins obtained through radical polymerization. A thermosetting resin generally provides a relatively good carbonization yield, but it forms a viscous condensate difficult to handle at an initial stage of condensation and requires further many steps for sphering thereof. A spherical non-graphitizable carbon obtained from phenolic resin as the starting material is disclosed in Patent document 7 listed below, which however does not disclose a process for producing spherical phenolic resin as the starting material. Further, the resultant spherical non-graphitizable carbon exhibited a fairly low discharge capacity of 185 mAh/g. On the other hand, vinyl resins can be obtained as spherical polymerizates through radical suspension polymerization, but most of them cause de-polymerization or thermal decomposition at the time of carbonization treatment, thus failing to leave a substantial amount of carbonization product. Further while the carbonization of a synthetic resin generally results in a non-graphitizable carbon, but such a non-graphitizable carbon is liable to be oxidized when left in the air, thus resulting in an increase of irreversible capacity. This difficulty has been obviated by storing the non-graphitizable carbon or an electrode obtained by using it in a layer of negative electrode active substrate in a non-oxidizing gas atmosphere, which however has posed a substantial problem in the production process.

Patent document 1: JP-A 57-208079
Patent document 2: JP-A 62-90863
Patent document 3: JP-A 62-122066
Patent document 4: JP-A 2-66856
Patent document 5: JP-A 11-185821
Patent document 6: JP-A 6-150927
Patent document 7: JP-A 6-20680

DISCLOSURE OF INVENTION

In view of the above-mentioned problems of the conventional materials, the present invention aims at providing a negative electrode material for non-aqueous electrolyte secondary battery which has a high output performance, a high durability and a high discharge capacity, a process for production thereof, and an electrode and a non-aqueous electrolyte secondary battery comprising the negative electrode material.

In the course of the present inventors' study for producing a negative electrode material for a non-aqueous electrolyte secondary battery exhibiting good performances as a power supply for HEVs, it has been found that a spherical carbon material obtained by subjecting a synthetic resin, particularly a vinyl resin, having controlled shape, particle size (diameter) and texture to an appropriate oxidation treatment and then to an appropriate carbonization process, provides a negative electrode material for non-aqueous electrolyte secondary batteries exhibiting high output performances, high charge-discharge capacities and high reliability, whereby the present invention has been arrived at.

The negative electrode material for non-aqueous electrolyte secondary batteries according to the present invention is based on the above findings and, more specifically, comprises: a carbon material having a sphericity of at least 0.8, and exhibiting an average (002) interlayer spacing $d_{002}$ of 0.365-0.400 nm, a crystallite size in a c-axis direction $Lc_{(002)}$ of 1.0-3.0 nm, as measured by X-ray diffractometry, a hydrogen-to-carbon atomic ratio (H/C) of at most 0.1 as measured by elementary analysis, and an average particle size $Dv_{50}$ of 1-20 μm.

The present invention further provides a process for producing the above-mentioned negative electrode material, an electrode for non-aqueous electrolyte secondary batteries formed by shaping the negative electrode material together with a binder, and a non-aqueous electrolyte secondary battery including the electrode as a negative electrode.

BEST MODE FOR PRACTICING THE INVENTION

The negative electrode material for non-aqueous electrolyte secondary batteries is a spherical non-graphitizable carbon. The degree of the sphericity thereof is represented by a (true) sphericity (particularly, a circularity C obtainable according to a method described hereinafter), and a value closer to 1 means closer to the true sphericity. The negative electrode material of the present invention has a sphericity of at least 0.8, preferably 0.90 or higher, further preferably 0.95 or higher.

The texture of the non-graphitizable carbon used in the present invention is characterized by an average (002) place spacing $d_{002}$ of at least 0.365 nm and at most 0.400 nm, and a crystallite size in a c-axis direction $Lc_{(002)}$ of 1.0-3.0 nm, as measured by X-ray diffractometry. A smaller average interlayer spacing represents a crystal structure which is a characteristic of graphitizable carbon having a turbostratic texture or a graphitic material obtained by treatment thereof at high temperatures. Such a graphitizable carbon material having a turbostratic texture or a graphitic material causes expansion and constriction at the time of doping and dedoping reactions of lithium, and are not preferred in view of problems in durability. Too large an average interlayer spacing represents an insufficient degree of carbonization and causes a non-favorable increase of irreversible capacity which is a value obtained by subtracting a dedoping capacity from a doping capacity, respectively of lithium. The average interlayer spacing $d_{002}$ is preferably 0.365-0.400 nm, further preferably 0.370-0.390 nm. As for the crystalline texture of carbon materials, it is difficult to differentiate a graphitizable carbon and a non-graphitizable carbon only by such an average interlayer spacing. Even a graphitizable carbon can exhibit an interlayer spacing larger than 0.350 nm if it has bean carbonized at a heat treatment temperature of 1000° C. or below, and even a non-graphitizable carbon can exhibit an interlayer spacing below 0.365 nm if it has been treated at a temperature of 2000° C. or higher. A non-graphitizable carbon having a smaller interlayer spacing is rather rich in closed pores and is provided with remarkably decreased dopable and dedopable amounts of lithium (charge-discharge capacity). Also from this viewpoint, the average interlayer spacing is preferably 0.365-0.400 nm, further preferably 0.370-0.390 nm.

A parameter for characterizing the texture of a non-graphitizable carbon other than the average interlayer spacing is a crystallite size in c-axis direction $Lc_{(002)}$. For a non-graphitizable carbon, the crystallite size $Lc_{(002)}$ tends to increase as the heat treatment temperature becomes higher, but does not exceed 10 nm even when heated at 3000° C. unlike that of a graphitizable carbon. Similarly as a smaller average interlayer spacing, a crystallite size $Lc_{(002)}$ in excess of 3 nm is accompanied with an undesirable increase of closed pores, leading to a lowering in doping-dedoping capacities. On the other hand, a crystallite size smaller than 1.0 nm represents an undesirably insufficient formation of carbon skeleton, and also is accompanied with a problem that an accurate measurement becomes difficult because of remarkably weaker intensity of (002) diffraction lines. Accordingly, the crystallite size $Lc_{(002)}$ is preferably 1.0-3.0 nm, further preferably 1.0-2.5 nm, particularly preferably 1.0-2 nm.

A hydrogen-to-carbon atomic ratio (H/C) as measured by elementary analysis provides a good index of carbonization degree of a carbon material. A lower carbonization degree is accompanied with an increase of undesirable irreversible capacity due to abundant presence of functional groups reacting with lithium. The hydrogen-to-carbon atomic ratio (H/C) is preferably at most 0.1, further preferably at most 0.05, particularly preferably 0.02 or below.

In order to improve the output characteristic, it is important to make thinner the active substance layer in the electrode, and for this purpose, a smaller average particle size is important. However, too small an average particle size leads to an undesirably increased amount of fine powder, which adversely affects the safety. Further, too small a particle size requires a larger amount of binder, which results in an undesirable increase of electrode resistance. On the other hand, a larger average particle size results in an undesirable increase in diffusion free path of lithium, by which quick charge-discharge becomes difficult. The average particle size in terms of $Dv_{50}$ (i.e., a particle size giving a cumulative volume of 50%) is preferably 1-20 µm, further preferably 4-15 µm, particularly preferably 4-10 µm.

In order to improve the output characteristic, it is important to make thinner the active substance layer in the electrode, and for this purpose, a smaller maximum particle size is important. The maximum particle size is preferably at most 50 µm, further preferably at most 40 µm. A smaller maximum particle size leads to a smaller average particle size. Thus, it is preferred for the negative electrode material of the present invention to have a uniform particle size distribution in addition to the above-mentioned average particle size, whereby it becomes possible to form a uniformly thin active substance layer. More specifically, a preferable uniformity of particle size of the negative electrode material according to the present invention is represented by a particle size disperse factor $D_4/D_1$ defined as a ratio of a weight-average particle size $D_4 (=\Sigma(nD^4)/\Sigma(nD^3))$ to a length-average particle size $D_1 (=\Sigma nD/\Sigma n)$ of at most 3.0, preferably at most 2.0, particularly preferably at most 1.5.

In order to suppress the decomposition of an electrolyte solution, it is preferred to provide a smaller specific surface area. However, the average particle size and the specific surface area are in a relationship of mutually inverse proportion, and a smaller average particle size tends to result in a larger specific surface area. In the present invention, by providing the negative electrode material with a shape of sphere which can minimize the specific surface area per volume and also by optimization of the texture and controlling the surface structure of the synthetic resin as a carbon precursor, it has become possible to provide a remarkably smaller specific surface area even at a particle size smaller than that of a negative electrode material obtained through pulverization. From this viewpoint, it is preferred to provide as small a product of specific surface area S ($m^2/g$) and average particle size $Dv_{50}$ as possible. On the other hand, too small a product of specific surface area S ($m^2/g$) and average particle size $Dv_{50}$ leads to undesirable obstruction of the doping-dedoping reactions of lithium. The product of S ($m^2/g$) and $Dv_{50}$ is preferably 3-40, further preferably 3-30.

In order to provide a negative electrode carbon material with a relatively small surface area, it is also preferred to incorporate ca. 0.5-5 wt. % of nitrogen. The incorporation of an excessive amount of nitrogen leads to an undesirable increase of reaction with lithium.

It is preferred for the negative electrode carbon material of the present invention to have a surface structure coated with a silicon compound or a surface texture with enhanced carbonization, for the purpose of suppressing the increase of irreversible capacity due to surface oxidation in the air. The coating rate of the silicon compound is preferably 0.1-10 wt. %, further preferably 0.5-5 wt. %, in terms of an amount of silicon oxide remaining after combustion of the spherical carbon material in an atmosphere of oxidizing gas such air (with respect to the carbon material). On the other hand, in order to provide the surface texture with an enhanced carbonization degree, a higher carbonization temperature is preferred. An exothermic peak temperature in air according to differential thermal analysis gives a good index of the surface oxidizability in air of a negative electrode carbon material. A higher exothermic peak temperature is preferred as it represents a difficulty of surface oxidation, but too high an exothermic peak temperature leads to an undesirable lowering in dedoping capacity. The exothermic peak temperature is preferably 600-700° C., further preferably 610-690° C., particularly preferably 620-680° C.

A bulk specific gravity varies depending on the shape and particle size distribution of a carbon material and the micro texture of carbon and is therefore further useful for expressing the characteristic of the negative electrode material according to the present invention. Too low a bulk specific gravity undesirably lowers the density of the electrode active substance layer to result in a lower energy density per battery volume. On the other hand, too high a bulk specific gravity undesirably decreases the void to lower the mobility of lithium ions in the electrolyte solution, thus making difficult a quick discharge. In case where too high a bulk specific gravity is caused not by a particle shape but by a high true density of the particles, it is accompanied with undesirable expansion and constriction of crystallites of the particles, thus resulting in lower repetition characteristics. The bulk specific gravity is preferably at least 0.40 and below 0.60, further preferably 0.50-0.58.

The spherical carbon material of the present invention is obtainable by subjecting a spherical synthetic resin to an oxidation treatment in an oxidizing gas atmosphere at a temperature of 150-400° C. to form a thermally infusible spherical carbon precursor, and then carbonizing the carbon precursor in a non-oxidizing gas atmosphere. Too low a heat-treatment temperature in the non-oxidizing gas atmosphere undesirably results in an increase of irreversible capacity of the resultant negative electrode material and also an increase of irreversible capacity with time when left standing in an oxidizing gas atmosphere. On the other hand, too high a heat treatment temperature undesirably lowers the dedoping capacity. The heat-treatment temperature is preferably 1050-1500° C., further preferably 1100-1500° C., particularly preferably 1200-1400° C.

As a spherical synthetic resin preferably usable in the present invention, it is possible to use a thermosetting resin, such as phenolic resin or furan resin, but it is particularly preferred to use a carbon precursor obtained by applying an infusibilization treatment to a sphered thermoplastic resin, particularly a vinyl resin obtained by radical polymerization. The sphering of a thermoplastic resin can be effected, e.g., by dispersion of a molten resin into a gas or hot water, but may preferably be effected by suspension polymerization in an aqueous dispersion medium.

A spherical vinyl resin particularly preferably usable in the present invention may, for example, be obtained in the following manner. Thus, a monomer mixture comprising a radically polymerizable vinyl monomer and a polymerization initiator is added into an aqueous dispersion medium containing a dispersion stabilizer and suspended under stirring-mixing to form fine liquid droplets, and the system is elevated in temperature to proceed with radical polymerization, thereby forming a vinyl monomer in a true spherical form.

The vinyl monomer can be any vinyl monomer capable of forming a vinyl resin which in turn can provide a carbon precursor through oxidation, whereas in order to provide a crosslinked vinyl resin giving an increased carbonization yield, a vinyl monomer mixture containing a crosslinking agent is preferably used. Further, from the viewpoints of providing a high carbonization yield from the resultant spherical vinyl resin and also a spherical carbon exhibiting preferable battery performance, it is particularly preferred to use a starting monomer mixture comprising 10-80 wt. % of a styrene monomer, 10-90 wt. % of an acrylonitrile monomer, and a crosslinking agent in a proportion of at least 15 wt. % of the styrene monomer.

The styrene monomer includes, in addition to styrene; styrene derivative obtainable by replacing the vinyl group-forming hydrogen or phenyl group-forming hydrogen of styrene with a substituent, and compounds obtainable by bonding the vinyl group to a heterocyclic or polycyclic compound instead of the phenyl group of styrene. More specifically, representative examples thereof may include; α- or β-methylstyrene, α- or β-ethylstyrene, methoxystyrene, phenylstyrene, and chlorostyrene; o-, m- or p-methylstyrene, ethylstyrene, methylsilylstyrene, hydroxystyrene, cyanostyrene, nitrostyrene, aminostyrene, carboxystyrene and sulfoxystyrene; sodium styrenesulfonate; vinylpyridine, vinylthiophene, vinylpyrrolidone, vinylnaphthalene, vinylanthracene, and vinylphenyl.

The acrylonitrile monomer includes acrylonitrile and methocrylonitrile, of which acrylonitrile is preferred from the economical viewpoint.

It is preferred that the styrene monomer is contained at 10-80 wt. %, particularly 20-70 wt. %, in the monomer mixture. If the styrene monomer is below 10 wt. %, the content of the acrylonitrile monomer which is relatively water-soluble is increased, so that the formation of monomer droplets with a good sphericity is liable to be difficult during suspension polymerization. A styrene monomer content exceeding 80 wt. % is not preferred because it naturally reduces the contents of the acrylonitrile monomer and the crosslinking agent.

On the other hand, it is preferred that the acrylonitrile monomer is contained at 10-90 wt. % (more exactly at most 88.5 wt. % in view of the minimum content of the crosslinking agent), more preferably 20-80 wt. %, particularly preferably 30-70 wt. %, in the monomer mixture. The acrylonitrile monomer advantageously functions to increase the carbonization yield of the resultant vinyl resin and to decrease the specific surface area of the resultant spherical carbon material, thereby suppressing the decomposition of the electrolyte at the carbon surface when used as the negative electrode material of a non-aqueous electrolyte secondary battery. An acrylonitrile monomer below 10 wt. % leads to insufficiency of the above effect, and in excess of 90 wt. %, the resultant spherical vinyl resin is provided with an undesirably low sphericity.

It is preferred that the monomer mixture contains a crosslinking agent in a proportion of at least 15 wt. %, particularly 20 wt. % or more of the styrene monomer, with the proviso that the styrene monomer or the acrylonitrile monomer will not subside 10 wt. % that is the lower limit of each monomer in the monomer mixture. In case where the crosslinking agent is less than 15 wt. % of the styrene monomer, the spherical vinyl resin is liable to decompose or melt during the oxidation treatment (infusibilization treatment) so that the oxidation treatment becomes difficult.

The crosslinking agent may be selected from the group consisting of; divinylbenzene, divinylpyridine, divinyltoluene, divinylnaphthalene, diallyl phthalate, ethylene glycol diacrylate, ethylene glycol dimethylate, divinylxylene, divinylethylbenzene, divinylsulfone; polyvinyl or poly allyl ethers of glycols or glycerols, pentaerythritol, mono- or dithio derivatives of glycols, and resorcinol; divinyl ketone, divinyl sulfide, allyl acrylate, diallyl maleate, diallyl fumarate, diallyl succinate, diallyl carbonate, diallyl malonate, diallyl oxalate, diallyl adipate, diallyl sebacate, triallyl tricarballylate, triallyl aconitate, triallyl citrate, triallyl phosphate, N,N'-methylenediacrylamide, 1,2-di(α-methylmethylenesulfonamido)ethylene, trivinylbenzene, trivinylnaphthalene, polyvinylanthracene and trivinylcyclohexane. Particularly preferred examples of the crosslinking agent may include polyvinylaromatic hydrocarbons (e.g., divinylbenzene), glycol trimethacrylates (e.g., ethylene glycol dimethacrylate) and polyvinyl hydrocarbons (e.g., trivinylcyclohexane). The most preferred one is divinylbenzene because of its thermal decomposition characteristic.

The polymerization initiator is not particularly restricted but may be any one generally used in this field, whereas an oil-soluble polymerization initiator soluble in the polymerizable monomer is preferred. Examples of the polymerization initiator may include dialkyl peroxides, diacyl peroxides, peroxy esters, peroxydicarbonate and azo compounds. More specifically enumerated are; dialkyl peroxides, such as methyl ethyl peroxide, di-t-butyl peroxide and dicumyl peroxide; diacyl peroxides, such as isobutyl peroxide, benzoyl peroxide, 2,4-dichlorobenzoyl peroxide, and 3,5,5-trimethylhexanoyl peroxide; peroxy esters, such as t-butyl peroxypivalate, t-hexyl peroxy pivalate, t-butyl peroxy-neodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, and (α,α-bis-neodecanoylperoxy)diisopropylbenzene; peroxydicarbonates, such as bis(4-t-butylcyclohexyl)peroxydicarbonate, di-n-propyl peroxydicarbonate, diisopropyl peroxydicarbonate, di(2-ethylethyl)peroxydicarbonate, dimethoxybutyl peroxydicarbonate and di(3-methyl-3-methoxybutyl)peroxydicarbonate; and azo compounds, such as 2,2'-azobisisobutyronitrile, 2,2'-azobis(4-methoxy-2,4-dimethylvaleronitrile), 2,2'-azobis(2,4-dimethylvaleronitrile) and 1,1'-azobis(1-cyclohexanecarbonitrile).

The dispersion stabilizer used in the suspension polymerization is not particularly restricted, whereas silica is preferably used as a stabilizer since if silica (colloidal silica) is used as the stabilizer and the resultant true-spherical synthetic resin carrying the silica on its surface is carbonized to form a stable film on the resultant carbon, surface oxidation liable to occur during standing of the carbon material can be suppressed thereby. A dispersion liquid medium containing such a dispersion stabilizer may be prepared ordinarily by using deionized water together with an auxiliary stabilizer optionally added thereto. In the case of using colloidal silica as the dispersion stabilizer, it is preferred to effect the polymerization in an acidic medium. In the case of using colloidal silica, it is preferred to use a condensation product as an auxiliary stabilizer, and preferred examples of the condensation product may include condensates of diethanol amine and aliphatic dicarboxylic acids and condensates of aliphatic dicarboxylic acids, of which a condensate of diethanol amine adipate and itaconic acid is particularly preferred.

As the dispersion stabilizer, it is also possible to use methyl cellulose. In the case of using methyl cellulose, a stable film on the carbon surface is not formed unlike the case of using colloidal silica, but a favorable output characteristic is obtained because the absence of such a film on the carbon surface allows easy going into and out of the negative electrode carbon material of the active substance.

Further addition of an inorganic salt, such as sodium chloride, sodium sulfate or sodium nitrite, as an auxiliary stabilizer allows the production of a resin having a more uniform particle shape.

The particle size of the spherical synthetic resin obtained through suspension polymerization can be controlled based on the size of the liquid droplets. In order to provide a preferred average particle size of 1-20 μm for the negative electrode material of the present invention, the synthetic resin may preferably have a particle size of 5-30 μm, further preferably 5-20 μm.

The thus-obtained spherical synthetic resin can be converted into a spherical carbon precursor through an oxidation (infusibilization) treatment thereof for developing a crosslinked structure. The oxidation treatment may preferably be performed at a temperature of 150° C. to 400° C. As the oxidizing agent, it is possible to use an oxidizing gas, such as $O_2$, $O_3$, $SO_3$, $NO_2$, a mixture gas obtained by diluting these with air, nitrogen, etc., or an oxidizing gas such as air, or an oxidizing liquid, such as sulfuric acid, nitric acid or aqueous hydrogen peroxide.

By heat-treating the spherical carbon precursor at a temperature of 1000-1500° C., it is possible to produce a spherical carbon material suitable as a negative electrode material for non-aqueous electrolyte secondary batteries according to the present invention. The heat-treatment temperature is preferably 1050-1500° C., further preferably 1100-1500° C., particularly preferably 1200-1400° C.

The spherical carbon material of the present invention obtained in the above-described manner may, for example, be used for production of electrodes, as it is or together with an electroconductive aid comprising, e.g., electroconductive carbon black, such as acetylene black or furnace black in an amount of 1-10 wt. % thereof, in combination with a binder and an appropriate amount of solvent added thereto, followed by kneading to form a pasty electrode-forming composition, which is then applied onto an electroconductive substrate comprising, e.g., a circular or rectangular metal plate, dried and press-formed into a 10 to 200 μm-thick layer. The binder is not particularly restricted if it is not reactable with an electrolytic solution and may comprise polyvinylide fluoride, polytetrafluorethylene, styrene butadiene rubber (SBR), etc. In the case of polyvinylidene fluoride, a solution thereof in a polar solvent, such as N-methylpyrolidone (NMP), may preferably be used, whereas it is also possible to use an aqueous emulsion of SBR, etc. The binder may preferably be added in an amount of 0.5-10 wt. parts per 100 wt. parts of the spherical carbon material according to the present invention. Too large an addition amount of the binder is not preferred because it results in an increase in electrical resistance of the resultant electrode leading to an increased inner resistance of the battery and lower battery performances. On the other hand, too small an addition amount of the binder results in insufficient bonding of the spherical carbon material particles with each other and with the electroconductive substrate. The spherical carbon material of the present invention may preferably be used as an active substance of a negative electrode of a non-aqueous electrolyte secondary battery, particularly as a negative electrode active substance for a lithium secondary battery, by taking advantage of excellent doping characteristic thereof. The coating amount of the active substance is preferably as small as possible, so as to provide a larger output, and may preferably be at most 60 g/m², further preferably 50 g/m² or lower.

In the case of forming a negative electrode of a non-aqueous electrolyte secondary battery, other components of the battery, such as a positive electrode material, a separator and an electrolytic solution, are not particularly restricted, and various materials conventionally used in or proposed to be used for non-aqueous electrolyte secondary batteries can be used.

For example, the positive electrode material may preferably comprise a complex metal chalcogenide, such as $LiCoO_2$, $LiNiO_2$, $LiMnO_2$, or $LiMn_2O_4$, and may be formed together with an appropriate binder and an electroconductivity-imparting carbon material into a layer on an electroconductive substrate.

A non-aqueous solvent-type electrolytic solution used in combination with such a positive electrode and a negative electrode may generally be formed by dissolving an electrolyte in a non-aqueous solvent, it is possible to use one or two or more species in combination of organic solvents, such as propylene carbonate, ethylene carbonate, dimethyl carbonate, diethyl carbonate, dimethoxyethane, diethoxyethane, γ-butyrolactone, tetrahydrofuran, 2-methyl-tetrahydrofuran, sulfolane and 1,3-dioxolane. On the other hand, as the electrolyte, it is possible to use $LiClO_4$, $LiPF_6$, $LiBF_4$, $LiCF_3SO_3$, $LiAsF_6$, $LiCl$, $LiBr$, $LiB(C_6H_5)_4$, $LiN(SO_3CF_3)_2$, etc. A secondary battery may generally be formed by oppositely disposing a positive electrode layer and a negative electrode layer prepared in the above-described manner optionally by the medium of a liquid-permeating separator comprising nonwoven cloth, another porous material, etc., and immersing them in an electrolytic solution.

It is also possible to use a solid electrolyte comprising a polymer gel impregnated with an electrolytic solution instead of such a separator.

EXAMPLES

Hereinbelow, the present invention will be described more specifically with reference to Examples. Physical property values described in the specification including the following Examples are based on values obtained according to the following method.

(1) Measurement of Particle Size Distribution:

Three drops of dispersing agent (a cationic surfactant: "SN DISPERSANT 7347-C", made by San Nopco K.K.) was added to ca. 0.1 g of a sample to wet the sample with the dispersing agent. Then, 30 ml of deionized water was added thereto, and the mixture was subjected to dispersion by means of an ultrasonic washing machine for ca. 2 min, and to measurement of a particle size dispersion in a particle size range of 0.5-3000 μm by using a particle size distribution meter ("SALD-3000J", made by Shimadzu Corporation).

(2) Average Particle Size $Dv_{50}$(μm):

From the particle size distribution determined in the above section (1), a particle size giving a cumulative volume of 50% was taken as an average particle size $Dv_{50}$(μm).

(3) Particle Size Distribution Factor $D_4/D_1$:

Determined as a ratio $D_4/D_1$ between a weight-average particle size $D_4$ (=$\Sigma(nD^4)/\Sigma(nD^3)$) and a length-average particle size $D_1$=($\Sigma nD/\Sigma n$) (wherein D denotes a particle size of individual particles and n denotes the number of particles having the particle size) respectively obtained from the particle size distribution determined in the above section (1).

(4) Sphericity:

Carbon material particles were embedded in epoxy resin and, after being polished, the sample was observed through an optical microscope, then, 30 particles that had a particle size in a range of the average particle size $Dv_{50}$±50% and were free from overlapping or contact with other particles, were selected and subjected to a planar image analysis of the particles by means of a high-performance image analysis system ("IP-500PC", made by Asahi Engineering K.K.) to determine a sphericity in terms of an average value of circularities C calculated according to the following formula;

$$C=4\pi S/l^2,$$

wherein l denotes a circumferential length, and S denotes an area.

(5) Bulk Specific Gravity:

A bulk specific gravity was measured according to JIS K-6721: 1977. More specifically, ca. 120 mg of a sufficiently stirred sample was placed in a funnel bottomed with a damper of a bulk specific gravity meter (made by K.K. Kuramochi Kagaku Kiki Seisakusho), and then the dumper was withdrawn to drop the sample into a receiver vessel (100±0.5 ml). An amount of the sample rising above the receiver vessel was slitted off by a glass rod, and the vessel containing the sample was accurately weighed at an accuracy of 0.1 g. The bulk specific gravity was calculated down to 2 digits below a decimal point according to the following formula. The measurement was repeated 3 times to take an average value thereof.

Bulk Specific Gravity=(the weight of the vessel containing the sample (g)–the weight of the vessel alone (g))/the inner volume of the vessel (ml).

(6) Average Interlayer Spacing $d_{002}$ of a Carbon Material:

A powdery sample of a carbon material was packed in a sample holder and irradiated with monochromatic $CuK_\alpha$ ray through a graphite monochrometer to obtain an X-ray diffraction pattern. The peak position of the diffraction pattern was determined by the center of gravity method (i.e., a method wherein the position of gravity center of diffraction lines is obtained to determine a peak position as a 2 θ-value corresponding to the gravity center) and calibrated by the diffraction peak of (111) plane of high-purity silicon powder as the standard substance. The $d_{002}$ value was calculated by the Bragg's formula with the wavelength of the $CuK_\alpha$ ray as 0.15418 nm. Further, by subtracting a half-value width of (111) diffraction lines of the silicon powder from a half-value width obtained from the integration of the (002) diffraction lines to obtain a β value, from which a thickness $Lc_{(002)}$ of crystallites in the C-axis direction was calculated by the Scherrer's formula.

$$d_{002}=\lambda/2\cdot\sin\theta \qquad \text{(Bragg's formula)}$$

$$Lc_{(002)}=\kappa\lambda/\beta_{1/2}\cdot\cos\theta \qquad \text{(Scherrer's equation)}$$

(7) Hydrogen/Carbon (H/C) Atomic Ratio

A sample was subjected to elementary analysis by using a CHN analyzer, and a hydrogen/carbon (H/C) atomic ratio was calculated from the weight proportions of hydrogen and carbon in the sample.

(8) Specific Surface Area:

An approximate equation: $v_m=1/(v\cdot(1-x))$ derived from the BET equation was used to obtain $v_m$ at the liquid nitrogen temperature according to the BET single point method (at a relative pressure x (=0.3)) using nitrogen adsorption, and a specific surface area of the sample was calculated based on the following equation:

specific surface area=$4.35 \times v_m$ (m$^2$/g), wherein $v_m$ denotes an amount of adsorption (cm$^3$/g) required to form a mono-molecular layer, v denotes an actually measured amount of adsorption (cm$^3$/g), and x denotes a relative pressure.

More specifically, an amount of adsorbed nitrogen on a carbon material at the liquid nitrogen temperature was measured in the following manner by using "Flow Sorb II2300" made by Micromeritics Instrument Corp.

A sample carbon material pulverized to a particle diameter of ca. 5-50 μm was packed in a sample tube, and the sample tube was cooled to −196° C. while flowing helium gas containing nitrogen at a concentration of 30 mol %, thereby to cause the carbon material to adsorb nitrogen. Then, the sample tube was restored to room temperature to measure the amount of nitrogen desorbed from the sample by a thermal conductivity-type detector, thereby to obtain the adsorbed amount of the gas v.

(9) Exothermic Peak Temperature According to Differential Thermal Analysis:

Carbon sample powder was weighed at 2.0 mg on a platinum-made pan and set in a differential thermal analyzer ("DTG-50", made by Shimadzu Corporation), and while flowing dry air (having a dew point of −50° C. or below) at a rate of 100 ml/min, the carbon sample was held at 200° C. for 1 hour and then heated at a temperature-raising rate of 10° C./min to obtain an exothermic curve due to oxidation of the carbon material, from which a temperature showing a maxim exothermic quantity was taken as an exothermic peak temperature.

Examples and Comparative Examples are described below, wherein "%" representing a proportion of component means a wt. % unless otherwise noted specifically.

Example 1

Into 5176 g of water, 32 g of colloidal silica (160 g of silica dispersion liquid having a solid content of 20 wt. %), 3.96 g of diethanolamine-adipic acid condensation product (acid value=75 mg KOH/g) (7.92 g as a 50 wt. % liquid) and 0.99 g of sodium nitrite were successively added to prepare an aqueous dispersion medium, to which hydrochloric acid was added to provide a pH of ca. 3.5, followed by 10 minutes of a dispersion treatment by means of a homogenizer at 8000 rpm. On the other hand, 890 g of acrylonitrile (AN), 823 g of styrene (St), 266 g of divinylbenzene (DVB) and 10.69 g of 2,2'-azobis-2,4-dimethylvaleronitrile were blended to prepare a monomer mixture (corresponding to a monomer mixture obtained by blending a mixture A of St/DVB=76%/24% with AN at a ratio of mixture A/AN=55/45%, for convenience). The monomer mixture and the aqueous dispersion medium were stirred for 2 minutes at 3200 rpm by a homogenizer to form minute droplets of the monomer mixture. The aqueous dispersion medium containing the minute droplets of the polymerizable mixture was charged in a polymerization vessel (10 L) equipped with a stirrer, and subjected to reaction for 1 hour at 55° C. on a warming bath. Into the system, a dilution of 1.7 g of silane coupling agent with 42.8 g of acidic water (pH3.5) was charged and, 30 minutes thereafter, 27 g of 1% dilute hydrochloric acid was added, followed by further 20 hours of reaction at 55° C. The resultant polymerization product was filtered out from the aqueous phase, dried and disintegrated by a jet mill to obtain a true-spherical vinyl resin having an average particle size ($Dv_{50}$) of 17 μm.

60 g of the thus-obtained true-spherical vinyl resin was charged in a quartz-made vertical annular furnace equipped with a dispersion plate and caused to form a fluidized bed thereof, while blowing air upwards, followed by 1 hour of oxidation at 280° C. to form a spherical carbon precursor. The carbon precursor was found to have an oxygen content of 15 wt. % as a result of elementary analysis. The spherical carbon precursor was heat-treated for 1 hour in nitrogen to form a preliminarily calcined carbon, which was then placed in a horizontal tubular furnace, heated to 1200° C. in a nitrogen atmosphere and retained for 1 hour for main calcination, followed by cooling to form a spherical carbon material having an average particle size of 10 μm.

Some representative features of the-thus obtained carbon material are inclusively shown in Table 1 appearing hereinafter together with those of carbon materials obtained in the following Examples and Comparative Examples.

Example 2

A spherical carbon material was prepared in the same manner as in Example 1 except for changing the main calcination temperature from 1200° C. for 1 hour to 1300° C. for 1 hour.

Example 3

A spherical carbon material was prepared in the same manner as in Example 2 except for changing the temperature for oxidation of the spherical synthetic resin from 280° C. for 1 hour to 260° C. for 1 hour to change the oxygen content of the spherical carbon precursor from 15 wt. % to 10 wt. %.

Example 4

A spherical carbon material was prepared in the same manner as in Example 2 except for changing the composition of the monomer mixture to AN 1800 g, St 77 g, DVB 103 g, and 2,2'-azobis-2,4-dimethylvaleronitrile 10.69 g (mixture A: St/DVB=43%/57%; monomer mixture: mixture A/AN=9%/91%).

Example 5

A spherical carbon material was prepared in the same manner as in Example 2 except for changing the composition of the monomer mixture to AN 1380 g, St 403 g, DVB 177 g, and 2,2'-azobis-2,4-dimethylvaleronitrile 10.69 g (mixture A: St/DVB=70%/30%; monomer mixture: mixture A/AN=30%/70%).

Example 6

A spherical carbon material was prepared in the same manner as in Example 2 except for changing the composition of the monomer mixture to AN 590 g, St 977 g, DVB 413 g, and 2,2'-azobis-2,4-dimethylvaleronitrile 10.69 g (mixture A: St/DVB=70%/30%; monomer mixture: mixture A/AN=70%/30%), and changing the main calcination temperature from 1300° C. for 1 hour to 1350° C. for 1 hour.

Example 7

A spherical carbon material was prepared in the same manner as in Example 2 except for changing the composition of the monomer mixture to St 1194 g, DVB 781 g, and 2,2'-azobis-2,4-dimethylvaleronitrile 10.69 g (mixture A: St/DVB=60%/40%; monomer mixture: mixture A/AN=100%/0%)

Example 8

A spherical carbon material was prepared in the same manner as in Example 2 except for omitting the steps of adding the dilution of is 1.7 g of silane coupling agent with 42.8 g of acidic water (pH 3.5) and, 30 minutes there after, adding 27 g of 1% hydrochloric acid, and removing the colloidal silica from the polymerization product at time of the filtration, followed by drying and disintegration to obtain a true spherical vinyl resin having an average particle size of 17 μm.

Example 9

A spherical carbon material was prepared in the same manner as in Example 8 except for changing the main calcination temperature from 1300° C. for 1 hour to 1350° C. for 1 hour.

Example 10

An aqueous dispersion medium comprising 3750 g of water, 1525 g of 1.44 wt. %-methyl cellulose aqueous solution and 0.99 g of sodium nitrite was prepared. On the other hand, a monomer mixture comprising AN 675 g, St 375 g, DVB 440 g and 10.69 g of 2,2'-azobis-2,4-dimethylvoleronitrile was prepared. The monomer mixture and the aqueous dispersion medium were stirred for 20 minutes at 3000 rpm by a homogenizer to form minute droplets of the monomer mixture. The aqueous dispersion medium containing the minute droplets of the polymerizable mixture was charged in a polymerization vessel (10 L) equipped with a stirrer, and subjected to 20 hours of polymerization at 55° C. on a warming bath. The resultant polymerization product was filtered out from the aqueous phase, dried and disintegrated by a jet mill to obtain a true-spherical vinyl resin having an average particle size of 38 μm.

The thus-obtained true-spherical synthetic resin was subjected to the same treatments as in Example 1 except for changing the main calcination temperature from 1200° C. for 1 hour to 1350° C. for 1 hour to obtain a true-spherical carbon material.

Comparative Example 1

The true spherical synthetic resin obtained in Example 1 was subjected to the preliminary calcination while omitting the oxidation treatment, whereby the resin was caused to melt and foam, thus failing to provide an objective spherical carbon material.

Comparative Example 2

A spherical carbon material was prepared in the same manner as in Example 1 except for changing the main calcination temperature from 1200° C. for 1 hour to 900° C. for 1 hour.

Comparative Example 3

A true spherical vinyl resin was prepared in the same manner as in Example 1 except for changing the composition of the monomer mixture to St 1750 g, DVB 200 g, and 2,2'-azobis-2,4-dimethylvaleronitrile 10.69 g (mixture A: St/DVB=89%/10%; monomer mixture: mixture A/AN=100%/0%). The vinyl resin was subjected to the oxidation treatment in the same manner as in Example 1, whereby the synthetic resin was melted to fail in providing a spherical carbon precursor.

Comparative Example 4

68 kg petroleum pitch having a softening temperature of 210° C., a quinoline-insoluble content of 1 wt. % and an H/C atomic ratio of 0.63, and 32 kg naphthalene, were placed in a 300 liter-pressure-resistant vessel equipped with stirring blades, melt-mixed under heating at 190° C. and, after being cooled to 80-90° C., extruded to form a ca. 500 μm dia.-string-shaped product. Then, the string-shaped product was broken so as to provide a diameter-to-length ratio of ca. 1.5, and the broken product was charged into an aqueous solution containing 0.53 wt. % of polyvinyl alcohol (saponification degree=88%) and heated to 93° C., followed by stirring for dispersion and cooling to form a slurry of pitch spheres. After removing a major part of water by filtration, the pitch spheres were subjected to extraction with ca. 6 times by weight of n-hexane to remove the naphthalene in the pitch spheres. The thus-obtained porous spherical pitch was heated to 260° C. in a fluidized bed while passing heated air and held at 260° C. for 1 hour to be oxidized into a thermally-infusible porous spherical oxidized pitch. The oxidized pitch was found to have an oxygen content of 17 wt. %. The oxidized pitch was then heated to 600° C. in a nitrogen gas atmosphere (normal pressure) and held at 600° C. for 1 hour for preliminary heating to obtain a carbon precursor having a volatile matter content of at most 2%. The carbon precursor was pulverized to form a powdery carbon precursor having an average particle size of 10 μm, which was then charged in a calcination furnace of a nitrogen gas atmosphere, heated to 1200° C. and held at that temperature for 1 hour for main calcination, followed by cooling to obtain a powdery carbon material.

Comparative Example 5

The porous spherical pitch prepared in the same manner as in Comparative Example 4 was heated to 160° C. in a fluidized bed while passing heated air and held at 160° C. for 1 hour to form an porous spherical oxidized pitch. The oxidized pitch was found to have an oxygen content of 2 wt. %. The oxidized pitch was then heated to 600° C. in a nitrogen gas atmosphere (normal pressure) and held at 600° C. for 1 hour to be crystallized into a carbon precursor having a volatile matter content of at most 2%. The carbon precursor was pulverized to form a powdery carbon precursor having an average particle size of 12 μm, which was then charged in a calcination furnace, heated in a nitrogen stream to 1200° C. and held at 1200° C. for 1 hour for main calcination followed by cooling to form a powdery carbon material having an average particle size of 10 μm.

Comparative Example 6

Needle coke was pulverized to form a powdery carbon precursor having an average particle size of 12 μm. The powdery carbon precursor was then charged in a calcination furnace, heated in a nitrogen stream to 1200° C. and held at 1200° C. for 1 hour for main calcination, followed by cooling to form a powdery carbon material having an average particle size of 10 μm.

Comparative Example 7

True-spherical form phenolic resin having an average particle size of 17 μm ("MARILIN", made by Gun Ei Kagaku K.K.) was heated to 600° C. in a nitrogen gas atmosphere (normal pressure) and held at 600° C. for 1 hour for preliminary calcination to obtain a spherical carbon precursor having a volatile content of at most 2%. Then, the spherical carbon precursor was charged in a calcination furnace, heated in a nitrogen stream to 1200° C. and held at 1200° C. for 1 hour for main calcination, followed by cooling to form a true-spherical carbon material.

Comparative Example 8

A true-spherical carbon material was prepared in the same manner as in Comparative Example 7 except for changing the main calcination conditions from 1200° C. for 1 hour to 1000° C. for 1 hour.

Comparative Example 9

A true-spherical carbon material was prepared in the same manner as in Example 8 except for changing the main calcination conditions from 1300° C. for 1 hour to 1080° C. for 1 hour.

(Doping/Dedoping Capacity for Active Substance)

Electrodes were formed by using the carbon materials obtained in the above-described Examples and Comparative Examples, and the electrode performances and the preservability thereof were evaluated, through the following steps (a)-(f).

(a) Preparation of an Electrode.

90 wt. parts of a carbon material as described above and 10 wt. parts of polyvinylidene fluoride ("KF#1100" made by Kureha Chemical Industry Co., Ltd.) were formed together with NMP into a paste composition P, which was then evenly applied onto a copper foil. After being dried, the composition was peeled from the copper foil and stamped into a 15 mm-dia. disk. The amount of the carbon material in an electrode was adjusted to ca. 20 mg.

(b) Preparation of a Test Cell.

The carbon material of the present invention is generally suited for constituting a negative electrode of a non-aqueous electrolyte secondary battery, but the above-prepared electrode was used to form a lithium secondary battery together with a counter electrode comprising lithium metal showing stable properties so as to accurately evaluate the discharge capacity (de-doping capacity) and irreversible capacity (non-de-doping capacity) of cell active substance without being affected by a fluctuation in performances of the counter electrode.

More specifically, the above-prepared 15 mm-dia. disk formed from the carbon material of each of the about Examples and Comparative Examples was press-bonded to a 17 mm-dia. disk-shaped net of stainless steel which had been spot-welded in advance to an inner lid of a coin-shaped cell can of 2016-size (i.e., 20 mm in diameter and 1.6 mm in thickness), to from an electrode.

The preparation of a lithium electrode was performed in a glove box of an Ar atmosphere. A 17 mm-dia. disk-shaped net of stainless steel was spot-welded in advance to an outer lid of the 2016-size coin-shaped cell can, and a 0.5 mm-thick thin plate of lithium metal stamped into a 15 mm-dia. disk was press-bonded onto the disk of stainless steel net to provide a counter electrode.

The thus-prepared pair of electrodes were disposed opposite to each other with a 17 mm-dia. polypropylene-made porous membrane as a separator and assembled together with an electrolyte liquid comprising a mixture solvent of propylene carbonate and dimethoxyethane mixed in a volume ratio of 1:1 and $LiClO_4$ added thereto at a rate of 1 mol/liter in an Ar-glove box to form a 2016-size coin-shaped non-aqueous electrolyte lithium secondary battery (cell).

(c) Measurement of Cell Capacity.

A lithium secondary battery of the above-described structure was subjected to a charge-discharge test by using a charge-discharge tester ("TOSCAT", made by Toyo System K.K.). The charging and discharging were performed according to the constant current-constant voltage method. The "charging" is caused as a discharging reaction of the test cell but the reaction is caused by insertion of lithium into a carbon material and is therefore described herein as "charging" for conveniences. On the other hand, the "discharging" is caused as a charging reaction of the test cell but is described herein as "discharging" since it is caused by liberation of lithium from the carbon material. Under the constant current-constant voltage conditions adopted herein, the charging was continued at a constant current density of 0.5 mA/cm² until the cell voltage reached 0 V, and thereafter charging was continued by continuously changing the current value so as to keep a constant voltage of 0 V until the current value reached 20 μA. The electricity supple at this time was divided by the weight of the carbon material in the electrode to provide a charge capacity per unit weight of carbon material (mAh/g) defined herein. After completion of the charging, the cell circuit was made open for 30 minutes, thereafter the discharging was effected. The discharging was performed at a constant current density of 0.5 mA/cm² until-the cell voltage reached 1.5 V, and the electricity discharged at this time was divided by the weight of the carbon material in the electrode to provide a discharge capacity per unit weight of carbon material (mAh/g) defined herein. An irreversible capacity was calculated as the charge capacity—the discharge capacity.

Charge-discharge capacities and irreversible capacity for a sample were determined by averages of measured values for a number of measurement of 3 (n=3) performed by using test cells prepared for a single sample.

(d) Quick Charge-Discharge Test.

By using a lithium secondary battery (cell) of the above-described structure, the carbon material was charged in the same manner as in the section (c) above, and after completion of the charging under the constant current density, the cell circuit was made open for 30 minutes. There after, discharging was performed at a constant current density of 20 mA/cm², and the electricity discharged at this time was divided by the electrode to provide a quick discharge capacity (mAh/cm²) defined herein.

(e) Test for Preservability of Electrode Material

An irreversible capacity $I_0$ immediately after preparation (0 day) and an irreversible capacity $I_{30}$ after 30 days of storage in air (having a dew point of −60° C.) at 25° C. of a negative electrode material were measured according to the method described in the section (c) above, and a percentage of atmospheric deterioration was determined according to the following formula:

$$((I_{30}-I_0)/I_0)\times100.$$

(f) Repetition Performance Test 90 wt. parts of carbon material prepared in each of the above Examples and Comparative Example and 10 wt. parts of polyvinylidene fluoride ("KF#1100" made by Kureha Chemical Industry Co., Ltd.) were formed together with NMP into a paste composition P, which was then evenly applied onto a copper foil. After being dried, the composition was peeled from the copper foil and stamped into a 15 mm-dia. disk to form a negative electrode. The amount of the carbon material was adjusted to ca. 14 mg.

94 wt. parts of lithium cobaltate ($LiCoO_2$), 3 wt. parts of carbon black and 3 wt. parts of polyvinylidene flurried ("KF#1100", made by Kureha Chemical Industry Co., Ltd.) were formed together with NMP to form a paste composition, which was then evenly applied onto an aluminum foil. After being dried, the coating electrode was stamped into a 14 mm-dia. disk. The amount of lithium cobaltate in the positive electrode was adjusted so as to provide 80% of the charging capacity of the negative electrode active substance as measured in the suction (c) above, while assuming the capacity of lithium cobaltate to be 150 mAh/g.

The thus-prepared pair of electrodes were disposed opposite to each other with a 17 mm-dia. polypropylene-made porous membrane as a separator and assembled together with an electrolyte liquid comprising a mixture solvent of propylene carbonate and dimethoxyethane mixed in a volume ratio of 1:1 and $LiPF_6$ added thereto at a rate of 1 mol/liter in an Ar-glove box to form a 2016-size coin-shaped non-aqueous electrolyte lithium secondary battery (cell).

Under the constant current-constant voltage conditions adopted herein, the charging was continued at a constant current density of 3 mA/cm² until the cell voltage reached 4.2 V, and thereafter charging was continued by continuously changing the current value so as to keep a constant voltage of 4.2 V until the current value reached 50 μA. After completion of the charging, the cell circuit was made open for 30 minutes, thereafter the discharging was effected. The discharging was performed at a constant current density of 3 mA/cm² until the cell voltage reached 2.75 V. The charging and discharging were repeated in 25 cycles at 25° C., then the cell was warmed to 45° C., and the charge-discharge operation was repeated in further 100 cycles, whereby a discharge capacity after the 100 cycles was divided by the discharge capacity in the first cycle after the warming to provide a capacity retention rate (%).

The electrochemical performances of the carbon materials of Examples and Comparative Examples measured in the manners described in the above sections (a)-(f) were inclusively shown in Table 2 together with some representative physical properties of the carbon materials.

TABLE 1

| | Resin composition wt % | | | Silica content in the resin % | Oxygen content % | Calcination temp. ° C. | Carbonization yield % | Sphericity | H/C | N-content wt % | Silica content in the carbon material % |
|---|---|---|---|---|---|---|---|---|---|---|---|
| | St | DVB | AN | | | | | | | | |
| Example 1 | 41.8 | 13.2 | 45 | 1.6 | 15 | 1200 | 65 | 0.98 | 0.02 | 2.0 | 2.5 |
| Example 2 | 41.8 | 13.2 | 45 | 1.6 | 15 | 1300 | 61 | 0.99 | <0.01 | 1.8 | 2.9 |
| Example 3 | 41.8 | 13.2 | 45 | 1.6 | 10 | 1300 | 48 | 0.99 | <0.01 | 1.6 | 3.5 |
| Example 4 | 3.87 | 5.13 | 91 | 1.6 | 15 | 1300 | 45 | 0.99 | <0.01 | 3.8 | 2.3 |
| Example 5 | 20.3 | 8.7 | 70 | 1.6 | 15 | 1300 | 62 | 0.99 | <0.01 | 3.2 | 2.9 |
| Example 6 | 48.3 | 20.7 | 30 | 1.6 | 15 | 1350 | 61 | 0.98 | <0.01 | 1.6 | 2.9 |
| Example 7 | 60 | 40 | 0 | 1.6 | 15 | 1300 | 48 | 0.97 | <0.01 | 0.0 | 2.9 |
| Example 8 | 41.8 | 13.2 | 45 | 0 | 15 | 1300 | 58 | 0.99 | <0.01 | 1.8 | 0.0 |
| Example 9 | 41.8 | 13.2 | 45 | 0 | 15 | 1350 | 58 | 0.98 | <0.01 | 1.2 | 0.0 |
| Example 10 | 25 | 30 | 45 | 0 | 15 | 1350 | 58 | 0.98 | <0.01 | 3.8 | 0.0 |
| Comp. Ex. 1 | 41.8 | 13.2 | 45 | 1.6 | 0 | 1300 | 10 | — | — | — | 2.9 |
| Comp. Ex. 2 | 41.8 | 13.2 | 45 | 1.6 | 15 | 900 | 66 | 0.99 | 0.08 | 4.2 | 2.9 |

TABLE 1-continued

|  | Resin composition wt % | | | Silica content in the resin % | Oxygen content % | Calcination temp. °C. | Carbonization yield % | Sphericity | H/C | N-content wt % | Silica content in the carbon material % |
|---|---|---|---|---|---|---|---|---|---|---|---|
|  | St | DVB | AN |  |  |  |  |  |  |  |  |
| Comp. Ex. 3 | 90 | 10 | 0 | 1.6 | — | — | 8 | — | — | — | 2.9 |
| Comp. Ex. 4 | petroleum pitch | | | 0 | 15 | 1200 | — | 0.68 | 0.02 | 0.0 | 0 |
| Comp. Ex. 5 | petroleum pitch | | | 0 | 2 | 1200 | — | 0.65 | 0.02 | 0.0 | 0 |
| Comp. Ex. 6 | needle coke | | | 0 | — | 1200 | — | 0.71 | 0.01 | 0.0 | 0 |
| Comp. Ex. 7 | phenolic resin | | | 0 | — | 1200 | 40 | 0.97 | 0.03 | 1.7 | 0 |
| Comp. Ex. 8 | phenolic resin | | | 0 | — | 1000 | 43 | 0.96 | 0.06 | 2.1 | 0 |
| Comp. Ex. 9 | 41.8 | 13.2 | 45 | 0 | 16 | 1080 | — | 0.98 | 0.05 | 2.6 | 0 |

TABLE 2

|  | Particle size | | Specific surface area S | | X-ray diffraction data | | Bulk specific gravity | Exothermic peak temp. Tp °C. |
|---|---|---|---|---|---|---|---|---|
|  | $Dv_{50}$ μm | $D_4/D_1$ | m²/g | $S \times Dv_{50}$ | $d_{002}$ nm | $Lc_{(002)}$ nm |  |  |
| Example 1 | 8 | 1.28 | 2.8 | 22.4 | 0.390 | 1.0 | 0.54 | 622 |
| Example 2 | 9 | 1.25 | 1.4 | 12.6 | 0.385 | 1.1 | 0.55 | 637 |
| Example 3 | 7 | 1.31 | 1.7 | 11.9 | 0.373 | 1.2 | 0.55 | 639 |
| Example 4 | 9 | 1.26 | 1.0 | 9.0 | 0.384 | 1.1 | 0.54 | 637 |
| Example 5 | 8 | 1.33 | 2.0 | 16.0 | 0.383 | 1.1 | 0.55 | 638 |
| Example 6 | 10 | 1.23 | 3.2 | 32.0 | 0.375 | 1.3 | 0.56 | 645 |
| Example 7 | 8 | 1.26 | >30 | >240 | 0.395 | 1.1 | 0.54 | 640 |
| Example 8 | 12 | 1.26 | 3.2 | 38.4 | 0.380 | 1.1 | 0.53 | 637 |
| Example 9 | 11 | 1.25 | 3.0 | 33.0 | 0.374 | 1.2 | 0.55 | 660 |
| Example 10 | 17 | 1.23 | 3.6 | 61.2 | 0.378 | 1.1 | 0.55 | 664 |
| Comp. Ex. 2 | 11 | 1.28 | 4.0 | 44.0 | 0.405 | 0.9 | 0.48 | 615 |
| Comp. Ex. 4 | 9 | 4.42 | 6.0 | 54.0 | 0.380 | 1.1 | 0.48 | 640 |
| Comp. Ex. 5 | 12 | 4.51 | 1.5 | 18.0 | 0.356 | 2.3 | 0.59 | 735 |
| Comp. Ex. 6 | 7.8 | 4.63 | 2.5 | 19.5 | 0.349 | 2.5 | 0.62 | 760 |
| Comp. Ex. 7 | 14 | 1.45 | >30 | >420 | 0.386 | 0.9 | 0.51 | 650 |
| Comp. Ex. 8 | 14 | 1.45 | >30 | >420 | 0.395 | 0.9 | 0.47 | 649 |
| Comp. Ex. 9 | 12 | 1.28 | >30 | >420 | 0.401 | 0.9 | 0.5 | 623 |

|  | Electrochemical performances | | | | | |
|---|---|---|---|---|---|---|
|  | Dedoping capacity mAh/g | Irreversible capacity mAh/g | Efficiency % | Output performance mAh/cm² | Cycle performance % | Atmospheric degradation % |
| Example 1 | 545 | 121 | 82 | 3.8 | 89 | 2 |
| Example 2 | 469 | 100 | 82 | 3.5 | 90 | 1 |
| Example 3 | 458 | 95 | 83 | 3.4 | 92 | 1 |
| Example 4 | 471 | 105 | 82 | 3.6 | 90 | 0 |
| Example 5 | 465 | 98 | 83 | 3.5 | 91 | 1 |
| Example 6 | 434 | 75 | 85 | 3.3 | 93 | 2 |
| Example 7 | 455 | 110 | 81 | 3.4 | 89 | 0 |
| Example 8 | 470 | 99 | 83 | 3.5 | 90 | 6 |
| Example 9 | 372 | 85 | 81 | 4.2 | 92 | 1 |
| Example 10 | 357 | 81 | 82 | 4.1 | 93 | 0 |
| Comp. Ex. 2 | 592 | 255 | 70 | 3.0 | 75 | 7 |
| Comp. Ex. 4 | 430 | 80 | 84 | 2.3 | 91 | 10 |
| Comp. Ex. 5 | 322 | 98 | 77 | 2.2 | 73 | 2 |
| Comp. Ex. 6 | 233 | 50 | 82 | 2.1 | <70 | 1 |
| Comp. Ex. 7 | 415 | 132 | 76 | 3.0 | <70 | 3 |
| Comp. Ex. 8 | 415 | 132 | 76 | 4.0 | <70 | 5 |
| Comp. Ex. 9 | 540 | 165 | 77 | 3.2 | 84 | 8 |

INDUSTRIAL APPLICABILITY

As is apparent in view of the results shown in the above Tables 1 and 2, according to the present invention, there is provided a negative electrode material which comprises a spherical carbon material of a small and uniform particle size, is excellent in quick output performance and durability, has a large discharge capacity and is therefore extremely suitable for constituting a negative electrode of a non-aqueous electrolyte secondary battery.

The invention claimed is:

1. A negative electrode material for non-aqueous electrolyte secondary batteries, comprising: a carbon material having a sphericity of at least 0.8, and exhibiting an average (002) interlayer spacing $d_{002}$ of 0.365-0.400 nm, a crystallite size in a c-axis direction $LC_{(002)}$ of 1.0-3.0 nm, as measured by X-ray diffractometry, a hydrogen-to-carbon atomic ratio (H/C) of at most 0.1 as measured by elementary analysis, and an average particle size $Dv_{50}$ (μm) of 1-20 μm, and nitrogen in an amount of 0.5-5 wt %; wherein the carbon material further exhibits a specific surface area S (m²/g) giving a product $S \times Dv_{50}$ of 3-40 and the negative electrode material has a ratio $D_4/D_1$ of at most 3.0 between a weight-average particle size $D_4$ and a length average particle size $D_1$.

2. A negative electrode material according to claim 1, comprising a carbonization product of a vinyl resin.

3. A negative electrode material according to claim 1, having a bulk specific gravity of at least 0.40 and below 0.60.

4. A negative electrode material according to claim 1, exhibiting an exothermic peak temperature of at least 600° C.

5. A negative electrode material according to claim 1, comprising a surface of the carbon material coated with 0.1-10 wt. % of a silicon compound.

6. A process for producing a negative electrode material for non-aqueous electrolyte secondary batteries according to claim 1, comprising: oxidizing a spherical vinyl resin obtained through suspension polymerization to oxidation at a temperature of 150-400° C. in an oxidizing gas atmosphere to provide a carbon precursor and carbonizing the carbon precursor in an inert gas atmosphere.

7. A negative electrode for non-aqueous electrolyte secondary batteries, having a layer of active substance comprising a negative electrode material according to claim 1 and formed at a coating rate of at most 60 g/m².

8. A non-aqueous electrolyte secondary battery having a negative electrode according to claim 7.

9. A negative electrode material for non-aqueous electrolyte secondary batteries, comprising: a carbon material having a sphericity of at least 0.8, and exhibiting an average (002) interlayer spacing $d_{002}$ of 0.365-0.400 nm, a crystallite size in a c-axis direction $LC_{(002)}$ of 1.0-3.0 nm, as measured by X-ray diffractometry, a hydrogen-to-carbon atomic ratio (H/C) of at most 0.1 as measured by elementary analysis, and an average particle size $Dv_{50}$ (μm) of 1-20 μm, and nitrogen in an amount of 0.5-5 wt %; wherein the carbon material is a carbonization product of a vinyl resin and the negative electrode material has a ratio $D_4/D_1$ of at most 3.0 between a weight-average particle size $D_4$ and a length average particle size $D_1$.

10. A negative electrode material for non-aqueous electrolyte secondary batteries, comprising: a carbon material having a sphericity of at least 0.8, and exhibiting an average (002) interlayer spacing $d_{002}$ of 0.365-0.400 nm, a crystallite size in a c-axis direction $Lc_{(002)}$ of 1.0-3.0 nm, as measured by X-ray diffractometry, a hydrogen-to-carbon atomic ratio (H/C) of at most 0.1 as measured by elementary analysis, and an average particle size $Dv_{50}$ of 1-20 μm; wherein the carbon material further exhibits a nitrogen content of 0.5-5 wt. % and the negative electrode material has a ratio $D_4/D_1$ of at most 3.0 between a weight-average particle size $D_4$ and a length average particle size $D_1$.

* * * * *